US010097533B2

(12) United States Patent
Child et al.

(10) Patent No.: US 10,097,533 B2
(45) Date of Patent: Oct. 9, 2018

(54) DETECTION AND REPAIR OF BROKEN SINGLE SIGN-ON INTEGRATION

(71) Applicant: Okta, Inc., San Francisco, CA (US)

(72) Inventors: Reman P. Child, San Francisco, CA (US); Hassen Karaa, San Francisco, CA (US); Xin Gu, San Francisco, CA (US); Hector Aguilar-Macias, Palo Alto, CA (US); Andrew P. Drozdov, Scarsdale, NY (US)

(73) Assignee: OKTA, INC., San Francisco, CA (US)

( * ) Notice: Subject to any disclaimer, the term of this patent is extended or adjusted under 35 U.S.C. 154(b) by 329 days.

(21) Appl. No.: 14/846,706

(22) Filed: Sep. 4, 2015

(65) Prior Publication Data

US 2016/0080360 A1 Mar. 17, 2016

Related U.S. Application Data

(60) Provisional application No. 62/050,408, filed on Sep. 15, 2014.

(51) Int. Cl.
*H04L 29/06* (2006.01)
(52) U.S. Cl.
CPC .............................. *H04L 63/0815* (2013.01)
(58) Field of Classification Search
CPC ................................................... H04L 63/0815
See application file for complete search history.

(56) References Cited

U.S. PATENT DOCUMENTS

| 8,613,070 | B1 * | 12/2013 | Borzycki | G06F 21/6218 726/8 |
| 8,881,111 | B1 * | 11/2014 | Smith | G06F 11/3692 717/125 |
| 2002/0007460 | A1 * | 1/2002 | Azuma | H04L 63/0815 726/12 |
| 2003/0188193 | A1 * | 10/2003 | Venkataramappa | H04L 63/0815 726/10 |
| 2008/0059804 | A1 * | 3/2008 | Shah | G06F 21/41 713/186 |
| 2009/0083726 | A1 * | 3/2009 | Amend | H04L 63/105 717/171 |

(Continued)

OTHER PUBLICATIONS

PCT International Search Report and Written Opinion for PCT/US2015/048726, dated Jan. 26, 2016, 10 Pages.

(Continued)

*Primary Examiner* — Joseph P Hirl
*Assistant Examiner* — J. Brant Murphy
(74) *Attorney, Agent, or Firm* — Fenwick & West LLP (57) ABSTRACT

An identity management system provides single sign-on (SSO) services to clients, logging the clients into a variety of third-party services for which the clients have accounts. An SSO integration is stored for each of the third-party services, the SSO integration including information that allows the identity management system to automate the login for the corresponding third-party service, such as locations of the login pages, and/or identities of username and password fields. The identity management system uses different techniques in different embodiments to detect that a given SSO integration is broken (i.e., no longer permits login for its corresponding third-party service) and/or to repair the SSO integration.

33 Claims, 5 Drawing Sheets

(56) References Cited

U.S. PATENT DOCUMENTS

| | | | | |
|---|---|---|---|---|
| 2009/0119763 A1* | 5/2009 | Park | ............... | H04L 63/0815 |
| | | | | 726/8 |
| 2009/0249439 A1* | 10/2009 | Olden | ............... | H04L 63/0815 |
| | | | | 726/1 |
| 2011/0277026 A1 | 11/2011 | Mugdha et al. | | |
| 2012/0023556 A1 | 1/2012 | Schultz et al. | | |
| 2012/0291114 A1* | 11/2012 | Poliashenko | ............ | G06F 21/41 |
| | | | | 726/8 |
| 2013/0086670 A1 | 4/2013 | Vangpat et al. | | |
| 2013/0290719 A1* | 10/2013 | Kaler | ............. | G06F 21/41 |
| | | | | 713/168 |
| 2014/0164154 A1* | 6/2014 | Ramaci | ............ | G06Q 20/3674 |
| | | | | 705/16 |
| 2014/0244429 A1* | 8/2014 | Clayton | ............ | G06Q 30/0631 |
| | | | | 705/26.7 |
| 2014/0244447 A1* | 8/2014 | Kim | ............. | G06Q 30/0254 |
| | | | | 705/27.2 |
| 2014/0244488 A1* | 8/2014 | Kim | ............. | G06Q 20/123 |
| | | | | 705/39 |
| 2014/0310792 A1* | 10/2014 | Hyland | ............ | H04L 63/0861 |
| | | | | 726/8 |
| 2015/0127771 A1* | 5/2015 | Bauer-Hermann | ..... | H04L 67/22 |
| | | | | 709/217 |

OTHER PUBLICATIONS

Webpage for dynatrace.com "Dynatrace User Experience Management," Dynatrace LLC, 2016, 6 pages, [online] [retrieved on Feb. 22, 2016] Retrieved from the Internet <URL:http://www.dynatrace.com/en/products/user-experience-management.html>.

* cited by examiner

DETECTION AND REPAIR OF BROKEN SINGLE SIGN-ON INTEGRATION

CROSS REFERENCE TO RELATED APPLICATIONS

The application claims the benefit of Provisional Application No. 62/050,408, filed on Sep. 15, 2014, which is hereby incorporated herein by reference.

BACKGROUND

1. Technical Field

This application generally relates to the field of user account information and, in particular, to detection and repair of broken single sign-on integration with third-party services over a computer network.

2. Background Information

A software application that requires a person to log in to an account usually uses a username/password combination as the authentication mechanism. Therefore, people who have accounts for several different applications must remember several passwords. To make this task easier, people use a single sign-on (SSO) service. The SSO service stores a user's credentials (e.g., username and password) for one or more SSO-integrated applications and automatically signs in the user to the corresponding third-party service user accounts using the relevant credentials.

The SSO service stores information regarding each SSO-integrated application, which enables the service to properly integrate with each application's sign-on process. (The information about an SSO-integrated application that allows the SSO service to automate application sign-on—such as form field implementations, locations of the sign-in screens, or the like—is hereinafter referred to as an "SSO integration.") If an application changes (e.g., its form fields, or the URL for its sign-on screen), then the SSO service might no longer properly integrate with that application's sign-on process, resulting in a broken SSO integration.

SUMMARY

In one embodiment, a computer-implemented method performed by an identity management system comprises storing, for each of a plurality a third-party services, a single sign-on (SSO) integration for the third-party service, the SSO integration comprising information enabling automated login to the third-party service; and detecting, for a first one of the third-party services and a corresponding first one of the SSO integrations, that the first SSO integration is broken.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
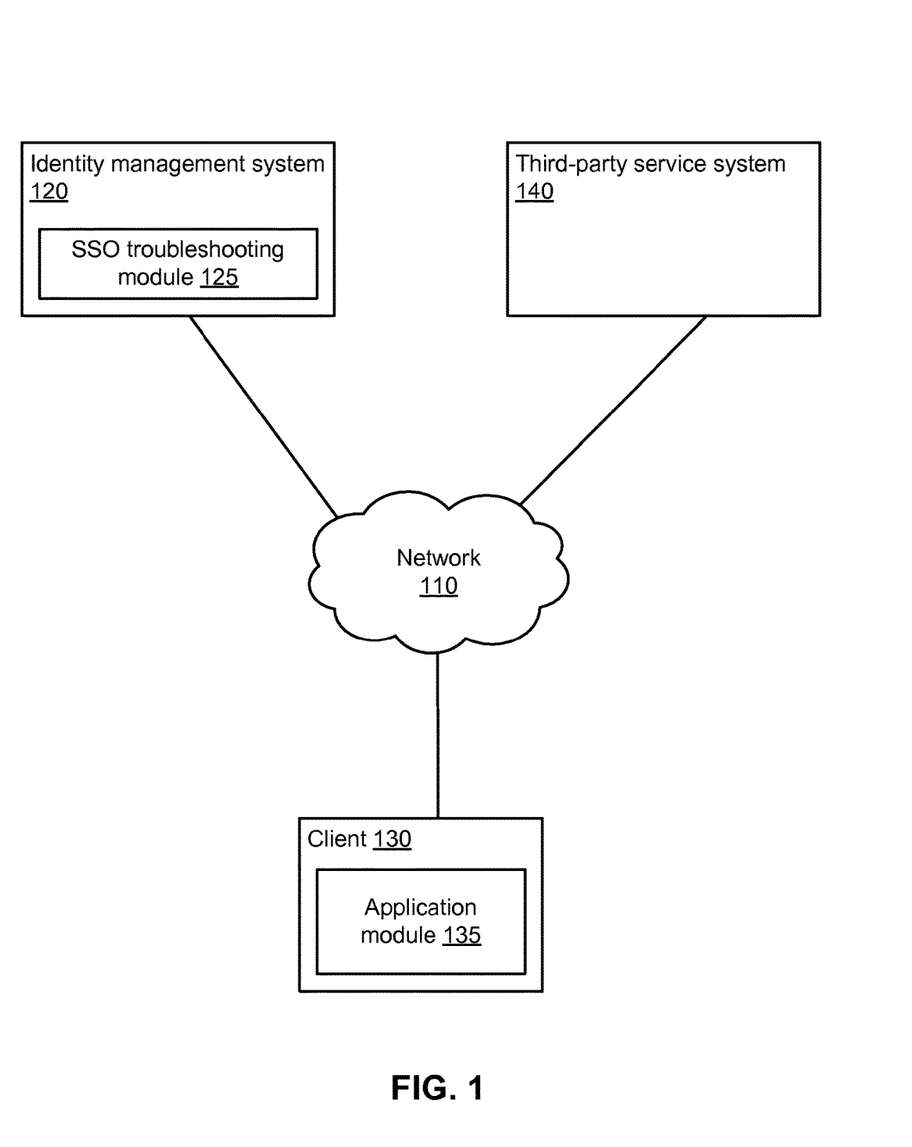
FIG. 1 is a high-level block diagram illustrating an environment for detecting and repairing a broken single sign-on integration, according to one embodiment.

FIG. 1 is a high-level block diagram illustrating an environment 100 for detecting and repairing a broken single sign-on (SSO) integration, according to one embodiment. The environment 100 may be maintained by an enterprise (e.g., an identity management service) that provides a SSO troubleshooting service that detects and/or repairs broken SSO integrations. For example, an identity management system 120 detects that an existing SSO integration is broken such that an SSO service can no longer automatically sign in a user (using a client 130) to a third-party service user account (managed by a third-party service system 140). As another example, an identity management system 120 repairs a broken SSO integration such that an SSO service can once again automatically sign in a user (using a client 130) to a third-party service user account (managed by a third-party service system 140).

As shown, the environment 100 includes a network 110, an identity management system 120, a client 130, and a third-party service system 140. While one identity management system 120, one client 130, and one third-party service system 140 are shown in the embodiment depicted in FIG. 1 for clarity, other embodiments can have different numbers of identity management systems, clients, and third-party service systems.

The network 110 represents the communication pathway between the identity management system 120, the client 130, and the third-party service system 140. In one embodiment, the network 110 uses standard wireless and wired communications technologies and protocols and can include the Internet and associated protocols. In another embodiment, the entities on the network 110 can use custom and/or dedicated data communications technologies.

A client 130 is a computer (or set of computers) that enables a user to access various third-party services. The client 130 can be, for example, a desktop computer, a laptop computer, a tablet computer, or a smart phone. The client 130 includes one or more application modules 135. A particular application module 135 enables the client 130 to access third-party services provided by a particular third-party service system 140. For example, an application module 135 interacts with a third-party service system 140 to log in to a user account of the third-party service system (e.g., using a username/password combination). After logging in, the application module 135 interacts with the third-party service system 140 to access various services.

In one embodiment, the application module 135 is a native application that executes on an operating system of the client 130. In another embodiment, the application module 135 is a plugin for a web browser of the client 130. In yet another embodiment, the application module 135 is a link to a webpage provided by the third-party service system 140.

The identity management system 120 is a computer (or set of computers) that provides identity management services. Identity management services include, for example, managing user accounts at various third-party services. For example, the identity management system 120 creates user accounts at various third-party services, configures the accounts with usernames and passwords, and can modify, deactivate, and delete the accounts if necessary.

In one embodiment, the identity management system 120 also provides single sign-on (SSO) services. For example, a user authenticates himself to the identity management system 120 by logging in to the identity management system using the client 130. The identity management system 120 then provides the client 130 with a single portal from which the user can access various third-party service user accounts without entering any additional authentication information (e.g., a username/password combination). For example, the user uses the portal to specify a particular third-party service, and the client 130 notifies the identity management system 120 accordingly. The identity management system 120 then accesses the appropriate authentication information (stored within the identity management system) and uses it to log in to the user's account at the specified third-party service system 140.

For example, in response to the user using a client 130 to launch an SSO-integrated application (application module 135), the identity management system 120 automatically provides the relevant authentication information to the corresponding third-party service system 140. In one embodiment, the identity management system 120 provides the relevant authentication information by inserting the information into the appropriate form fields of the application's sign-on screen(s) and executing a "sign in" command.

In one embodiment, the identity management system 120 provides SSO services by interacting with the third-party service system 140 via an application programming interface (API) provided by the third-party service system. In another embodiment, the identity management system 120 provides SSO services by interacting with the third-party service system 140 via a configurable web script that includes information regarding how to access the third-party service system. In one embodiment, the script uses machine learning techniques or explicit definitions to cause the third-party service system 140 to login a user. The machine learning techniques are, for example, related to heuristics that are used to identify webpages that request login information (e.g., a username/password combination). In one embodiment, the script conforms to the Extensible Markup Language (XML) standard. In another embodiment, a particular script is stored in association with a reference to a particular third-party service system 140. In yet another embodiment, the script is generated automatically.

The identity management system 120 includes a single sign-on (SSO) troubleshooting module 125. The SSO troubleshooting module 125 detects and repairs broken SSO integrations. For example, the SSO troubleshooting module 125 detects that an existing SSO integration is broken such that an SSO service can no longer automatically sign in a user (using a client 130) to a third-party service user account (managed by a third-party service system 140). As another example, the SSO troubleshooting module 125 repairs a broken SSO integration such that an SSO service can once again automatically sign in a user (using a client 130) to a third-party service user account (managed by a third-party service system 140). The SSO troubleshooting module 125 is further described below with reference to FIG. 3.

The third-party service system 140 is a computer (or set of computers) that provides various third-party services. A third-party service is, for example, a cloud-based application service, a web-based application service, a network-based application service, an on-premises application, an enterprise application, a consumer application, or a custom-built internal application. The third-party service system 140 maintains user accounts that are logged into in order to access the third-party services. The third-party service system 140 provides an API that can be used by external systems to interact with the third-party service system. For example, the identity management system 120 can use a third-party service system API to log in to a user account of the third-party service system 140.

Figure 2:
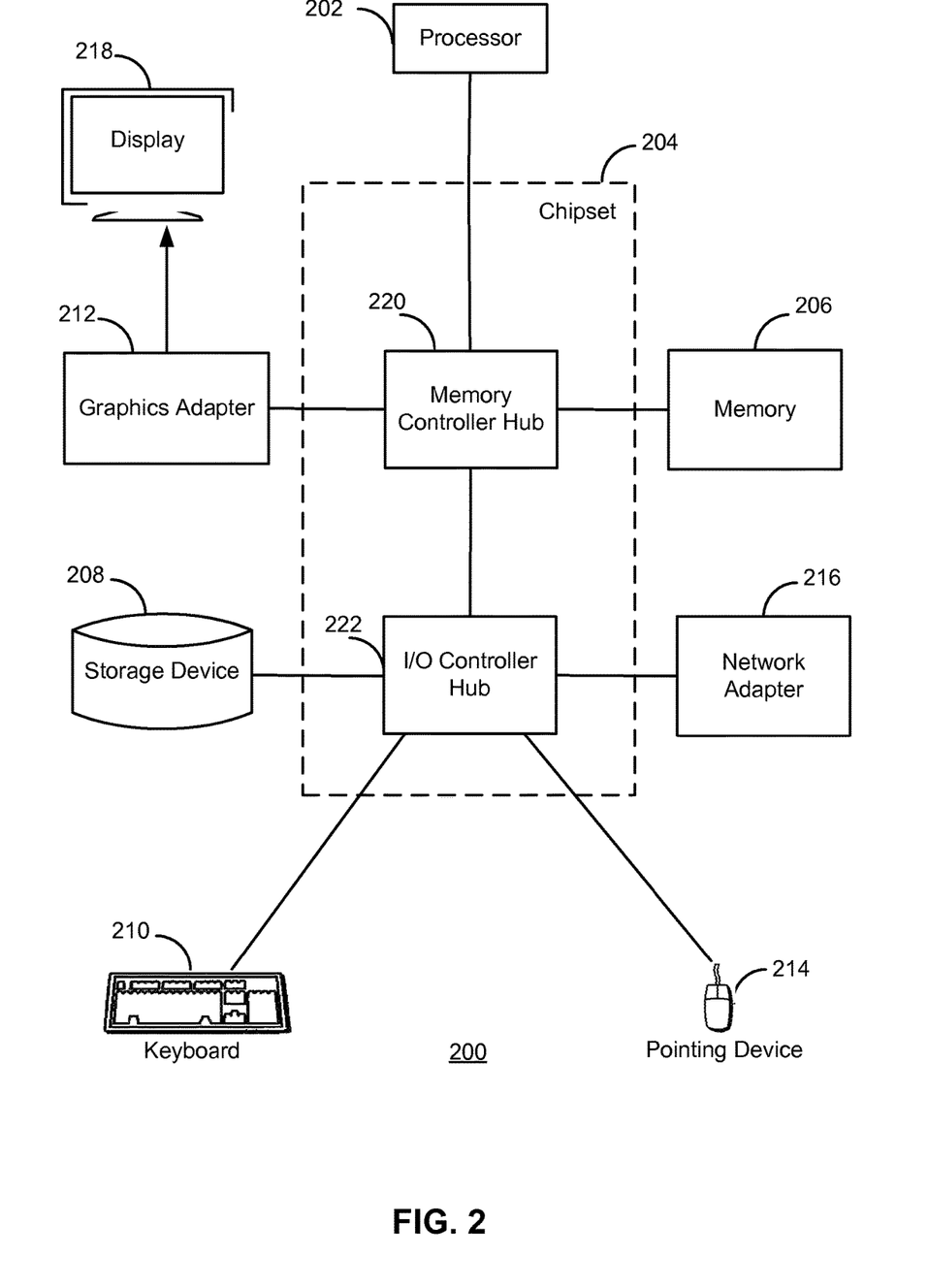
FIG. 2 is a high-level block diagram illustrating an example of a computer for use as one or more of the entities illustrated in FIG. 1, according to one embodiment.

FIG. 2 is a high-level block diagram illustrating an example of a computer 200 for use as one or more of the entities illustrated in FIG. 1, according to one embodiment. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 212 displays images and other information on the display device 218. In some embodiments, the display device 218 includes a touch screen capability for receiving user input and selections. The network adapter 216 couples the computer system 200 to the network 110. Some embodiments of the computer 200 have different and/or other components than those shown in FIG. 2. For example, the identity management system 120 and/or the third-party service system 140 can be formed of multiple blade servers and lack a display device, keyboard, and other components.

The computer 200 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
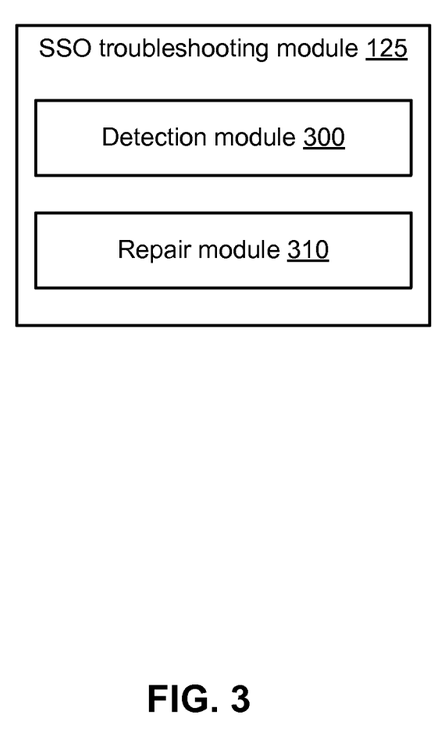
FIG. 3 is a high-level block diagram illustrating a detailed view of the single sign-on (SSO) troubleshooting module from FIG. 1, according to one embodiment.

FIG. 3 is a high-level block diagram illustrating a detailed view of the single sign-on (SSO) troubleshooting module 125 from FIG. 1, according to one embodiment. The SSO troubleshooting module 125 includes a detection module 300 that detects that an existing SSO integration is broken and a repair module 310 that repairs a broken SSO integration.

Recall that, in one embodiment, the identity management system 120 provides SSO services by storing information regarding each SSO-integrated application. This information enables the identity management system 120 to properly integrate with each application's sign-on process. For example, assume that the identity management system 120 provides SSO services by inserting the relevant authentication information into the appropriate form fields of the application's sign-on screen(s) and executing a "sign in" command. Applications can implement these form fields differently, so the site-flow mechanism by which the SSO service inserts username/password needs to be tailored for each application. Furthermore, the location (e.g., the URL (uniform resource locator)) of the sign-on page itself in the application is unique to each application. Changes to either the implementation of these form fields or address of the sign-on page can break the SSO integration. As the number of SSO-integrated applications grows, it becomes increasingly difficult to keep the integrations functional as the applications change. The SSO provider needs to constantly monitor the integrations, detect broken integrations, and repair them.

Detection of broken integrations may include manual involvement of the SSO service, although manual involvement requires human resources and creates a time lag between when the integration breaks and when the broken integration is detected. For example, in some embodiments the SSO service detects a break by manually testing the integrations (e.g., by a person navigating to a login page and typing in the username and password). As another example from some embodiments, the SSO service performs partially-automated tests using a software testing framework such as Selenium. The "partial automation" refers to the fact that a test is created manually and requires manually visiting the application to determine success conditions for the test. This approach becomes more difficult on a large scale because a) it must be performed for each SSO-integrated application and b) the tests break frequently given how often websites update Cascading Style Sheet (CSS) code, etc.

As yet another example from some embodiments, the SSO service relies on users' experiences with broken integrations. For example, a user reports a broken integration by completing a generic feedback form online for the SSO service or contacting the SSO service's customer support. As another example from some embodiments, when the user tries to sign in to an application for the first time, a prompt appears asking him if he was able to login. If the user says NO, then the SSO service knows that the application integration is broken. As yet another example from some embodiments, the SSO service has a team of people that reviews logs to determine whether application integration code could find elements that were expected in the page of the application in question. If it could not, then this would most likely indicate a sign-in failure.

The detection module 300 detects that an existing SSO integration is broken such that an SSO service can no longer automatically sign in a user (using a client 130) to a third-party service user account (managed by a third-party service system 140). For example, the detection module 300 detects a broken application integration in a semi-automated or fully-automated manner such that little or no manual intervention is required. The detection module 300 uses one or more of the following techniques:

Testing with Invalid Credentials—

The detection module 300 tests an application integration by attempting to sign in to the application with invalid credentials and analyzing the results to determine whether the integration is broken. The detection module 300 accesses a web script necessary to sign-in to the application. For security, financial, and practical reasons, the detection module 300 does not have the correct credentials to successfully sign-in to the application. The sign-in attempt fails because the credentials are invalid.

The detection module 300 determines whether the sign-in would have been successful had the credentials been correct. That is, the detection module 300 determines whether the result of the attempted sign-in with invalid credentials indicates that the credentials are invalid, but that attempted sign-in was otherwise legitimate. Instead of hardcoding success conditions for every application (e.g., looking for application-specific phrases or patterns), the detection module 300 uses a heuristic that gives a good probability of detecting login success or failure across several different applications.

Figure 4:
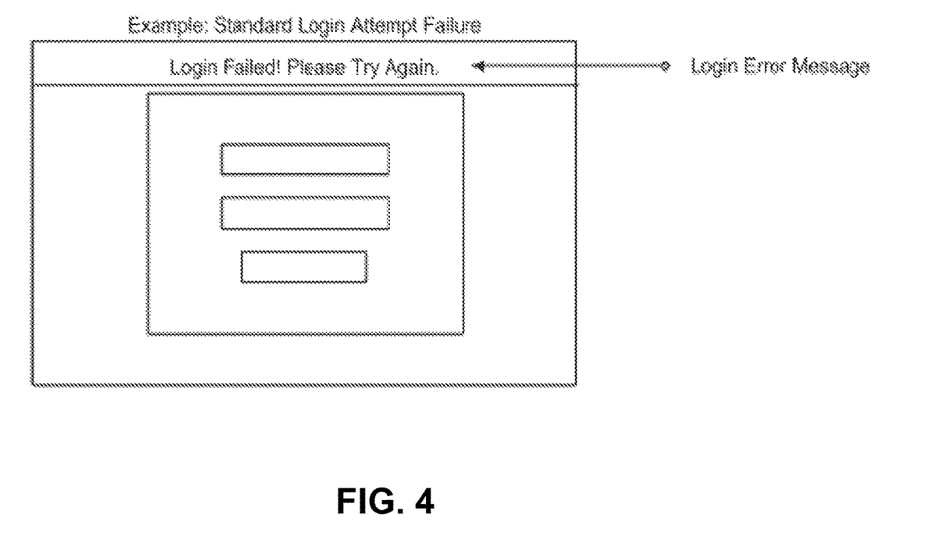
FIG. 4 is a graphical user interface for a standard login attempt failure, according to one embodiment.

For example, the detection module 300 parses an error message returned by the application and detects a signal that suggests inaccurate credentials. In one embodiment, the detection module 300 attempts to login to an application with known invalid credentials (e.g., credentials randomly selected, or fixed credentials used for every sign-in attempt) and parses (e.g., using regular expressions) the webpage that follows the sign-in attempt to look for specific strings of text indicating a sign-in failure ("incorrect password", "invalid credentials", etc.); if the specific strings are identified within the resulting webpages, then it is considered that the login attempt took place via the proper login UI, even though the login attempt failed due to the invalid credentials. The specific strings of text are determined by analyzing in the aggregate several (e.g., thousands of) SSO-integrated applications, e.g., with the most common phrases obtained via login with invalid credentials being selected as the specific strings of text that indicate a login failure. FIG. 4 is a graphical user interface for a standard login attempt failure, according to one embodiment. The standard login attempt failure in FIG. 4 includes a login error message "Login Failed! Please Try Again."

As another example, the detection module 300 compares a screenshot of the application's login page before the login attempt to a screenshot of the application's login page after the login attempt. The result of the comparison determines whether the login was successful. For example, the login was unsuccessful if the "after" screenshot includes a new user interface element (e.g., an error box) relative to the "before" screenshot or if the color content has changed (typically, an error is displayed using a shade of red).

If the heuristic is consistent with an invalid credentials case, then the detection module 300 determines that the application integration is not broken. If the heuristic is inconsistent with an invalid credentials case, then the detection module 300 determines that the application integration is broken. In one embodiment, the detection module 300 performs this type of testing periodically for multiple SSO-integrated applications using the relevant web scripts.

Monitoring Login Flows—

The detection module 300 detects that an existing SSO integration is broken by monitoring login flows of various users. During a successful application login process, a web browser navigates through a sequence of web pages until the browser finally lands on the homepage of the application. The detection module 300 monitors the browser's operation by capturing the uniform resource locators (URLs) of the pages and recording the pattern (e.g., a sequence of URLs) ("login flow") as a fingerprint of a successful login.

In one embodiment, for each application the detection module 300 logs the successful login patterns of multiple users into the application and establishes a baseline page sequence over a period of time. The detection module 300 then analyzes the login patterns of recent users and compares them to the baseline. When a new application login pattern is detected, the application is flagged as a potentially broken integration.

For example, a successful login flow could be: 1) foo.com/login; 2) foo.com/session (a multi-factor authentication verify page); and 3) foo.com/home. A deviation from that login flow (indicating a broken login flow) could be: 1) foo.com/login; and 2) foo.com/error. (Note that the browser never makes it to the application home page.) If such deviations are happening frequently, then the application is flagged as a potentially broken integration.

Application Sign-On Fingerprinting—

Given a broken application integration, the detection module 300 determines what caused the integration to break by monitoring changes in aspects of the login page. For example, the detection module 300 fingerprints an aspect of a login page (e.g., a hash value of the page's elements or login form) when the integration was working and then when the integration was broken. If the fingerprint changed, then the break was probably caused by a change in the login page. If the fingerprint did not change, then the break was probably caused by a change in the login flow or a browser plugin update.

Crowd-Sourced Testing—

The detection module 300 interacts with end users to obtain information that helps detect and/or confirm broken application integrations. In one embodiment, when a user attempts to login, the detection module 300 monitors subsequent user actions. For example, if the detection module 300 detects that a user attempted to login to the same application multiple times within a short time frame, then the integration is potentially broken. The detection module 300 then asks the user to confirm the type of problem he is experiencing (e.g., login failure). The detection module 300 then compares the user's response and login flow to those of other users of the same application. If the login flows match, then the detection module 300 flags that application integration as potentially broken.

The SSO troubleshooting module 125 executes the detection module 300 (to detect a broken SSO integration) based on occurrence of a trigger event. In one embodiment, possible trigger events include: a user requesting that an existing integration be tested or checked for being broken, an administrator requesting that an existing integration be tested or checked for being broken, or a time period expiring (so that trigger events would occur periodically). Note that after a trigger event occurs, the SSO troubleshooting module 125 can execute the detection module 300 immediately or after a configurable delay.

If the detection module 300 detects a broken integration, then the broken integration can be repaired manually or in an automated or semi-automated manner (e.g., using the repair module 310, as further described below). Note that the SSO troubleshooting module 125 can execute the repair module 310 immediately after the detection module 300 detects a broken integration or after a configurable delay.

Conventional repair of a broken SSO integration requires manual intervention by the SSO service provider. For example, the SSO service repairs the broken SSO integration by developing new integration code and deploying it. The manual involvement of the SSO service requires human resources and creates a time lag between when the broken integration is detected and when the broken integration is repaired.

The repair module 310 repairs a broken SSO integration such that an SSO service can once again automatically sign in a user (using a client 130) to a third-party service user account (managed by a third-party service system 140). For example, the repair module 310 repairs a broken application integration in a semi-automated or fully-automated manner such that little or no manual intervention is required. The repair module 310 uses one or more of the following techniques:

Sign-In Page Parsing—

Figure 5:
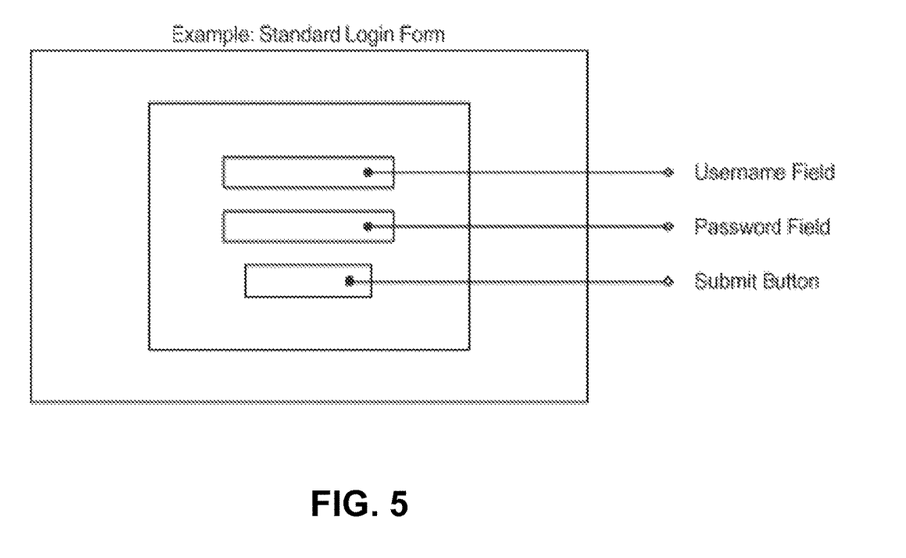
FIG. 5 is a graphical user interface for a standard login form, according to one embodiment.

In many cases, the existing application site flow integration was written manually. In this technique, after an integration is flagged as broken, the following steps are taken: The repair module 310 assumes that the login page URL has not changed. The repair module 310 then uses a heuristic to parse the login page looking for a standard sign-in form. Most login forms look similar, containing: 1) a hypertext markup language (HTML) <FORM> element, and inside it, 2) one text input (username), 3) one password input, and 4) (optionally) some form of submit button (e.g., input type='submit', button submit, image, or hyperlink that is styled to look like a button. FIG. 5 is a graphical user interface for a standard login form, according to one embodiment. The standard login form in FIG. 5 includes one username field, one password field, and one submit button.

For example, the repair module 310 identifies fields such as "username" and "password" based on the HTML labels of the fields, their positions in the page (the username field usually precedes the password field, etc.). The heuristic takes these into account and tries to find the most likely form on the page that matches these requirements.

Figure 6:
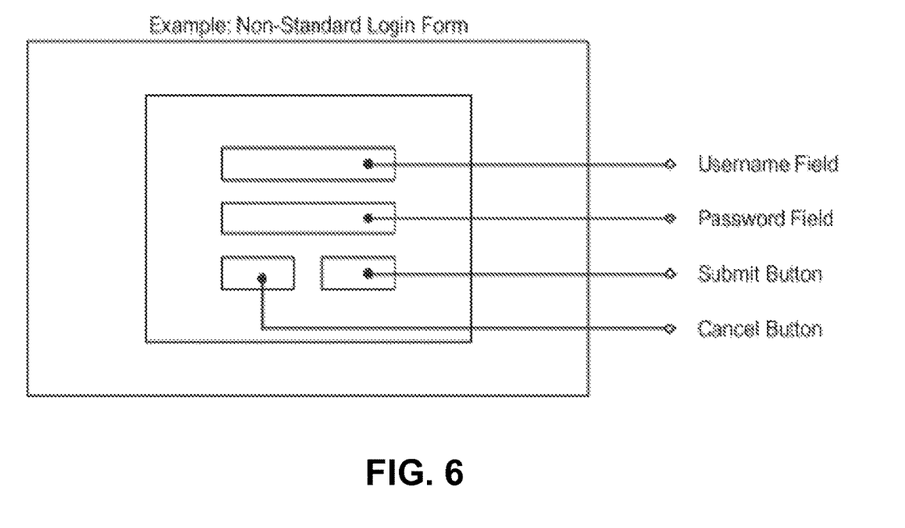
FIG. 6 is a graphical user interface for a non-standard login form, according to one embodiment.

Some login pages differ from the standard formula. For example, some pages have a cancel or reset button as well as a login button. FIG. 6 is a graphical user interface for a non-standard login form, according to one embodiment. The non-standard login form in FIG. 6 includes one username field, one password field, one cancel button, and one submit button. If the login page is non-standard, then the repair module 310 uses metrics to find (as the Submit button) the closest button to the password field, where distance is measured by document object model (DOM) distance (i.e., node distance in the DOM tree between the password field and the button) and/or pixel distance.

Once the repair module 310 uses the heuristic to determine a possible solution, the repair module tests the resulting integration using proper credentials (if they are available) or fake credentials. The heuristic is an integration "sign-on mode." The repair module tests the integration with the same code that the SSO service uses to sign in, so the only thing to do to create an integration is to create the metadata that says "use the heuristic." This is different from the manually-created integrations described above. Those integrations specifically hardcoded the exact buttons to click and the exact fields to enter text into.

The above steps can be repeated until a solution is achieved.

In another embodiment of this technique, the login page assumption is dropped. The repair module 310 uses a heuristic to examine the page (that it is trying to repair) for a login hyperlink to cover the situation where the website has an initial homepage and a dedicated login page. This is a different heuristic than the heuristic mentioned earlier in conjunction with the login page assumption. In general, the assumption-less heuristic works as follows: 1) the repair module 310 has navigated to a specific webpage in a domain for the application; 2) the repair module 310 tries to navigate to the root of the domain (e.g., by removing the path from after the domain in the URL); 3) the repair module 310 looks for login hyperlinks at the root of the domain (e.g., find hyperlinks on the webpage and parse the links for text like "login", "log in", "sign in", etc.); 4) if a login hyperlink is found, the target page for that hyperlink is obtained and analyzed as described above in the "Sign-In Page Parsing" section; 5) if the user interface page elements of the login page are found, the login page of the SSO integration is set to the current login page, and the login user interface page elements of the SSO integration are set to the page elements that were found.

In yet another embodiment of this technique, the repair module 310 tests the proposed solution that the heuristic produces directly on a group of users who use this application. For example, once the heuristic has a proposed solution, the repair module 310 tests the resulting site flow on a group of users (e.g., the set of users for which the problem was first detected). When one of the users next attempts to SSO into this application, the repair module 310 closely monitors their behavior and attempts to detect if they have successfully logged in. The repair module 310 can do this by analyzing patterns or directly asking the test users if they were successfully signed into the application. The patterns are, for example, login flows. The repair module 310 would detect login flows and notice deviations in the flows. If an integration was broken, and then a fix was released, then the login flows should revert to the pattern of successful logins. Alternatively, if something on the login page changed, then there is a chance that fixing the metadata would result in once again a successful login flow pattern also.

After the repair module 310 validates the fix, the repair module automatically replaces the broken integration with the new integration (e.g., for all users).

User-Assisted Repair—

In this technique, the repair module 310 relies on a user to generate a working integration. For example, the repair module 310 identifies a user who will attempt to use SSO to access an application whose integration is broken. Since the integration is broken, instead of attempting to SSO the user, the repair module 310 asks the user to help the repair module identify the key components required to build a working integration. In one embodiment, in a tutorial-like flow, the repair module 310 asks the user to identify the login URL of the application, the username field, the password field, the commit button, etc. The repair module 310 may assist the user in identifying the URL and/or page elements (such as fields or buttons), e.g., by highlighting or otherwise visually emphasizing elements (e.g., links, fields, or buttons) in the application web pages and monitoring whether the user clicks on or otherwise indicates the links and/or elements in response.

The repair module 310 uses the user's responses to generate a new, repaired integration. The repair module 310 uses the new integration to SSO that same user into the application. The repair module 310 asks the user to confirm that he was properly signed in. In one embodiment, to increase the level of confidence in the solution, the repair module 310 asks multiple users to complete this task. The repair module 310 compares the responses of the various users to make sure that the resulting integration is the correct one. After the repair module 310 identifies a new integration, the repair module automatically replaces the broken integration with the new integration (e.g., for all users).

The SSO troubleshooting module 125 executes the repair module 310 (to repair a broken SSO integration) based on occurrence of a trigger event. In one embodiment, possible trigger events include: manual detection of a broken integration (e.g., using conventional techniques), semi-automated or fully-automated detection of a broken integration (e.g., using the detection module 300), a user requesting that a broken integration be repaired, an administrator requesting that a broken integration be repaired, or a time period expiring (so that trigger events would occur periodically). Note that after a trigger event occurs, the SSO troubleshooting module 125 can execute the repair module 310 immediately or after a configurable delay.

Figure 7:
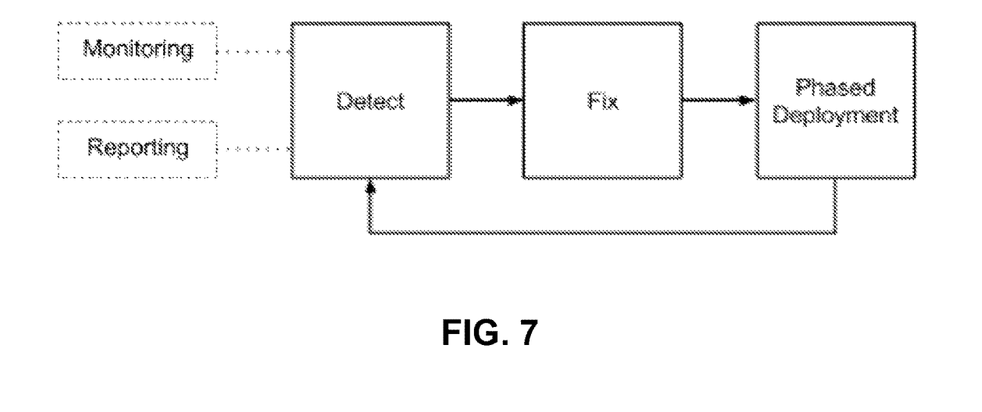
FIG. 7 is a flowchart of a method for detecting and repairing a broken single sign-on integration, according to one embodiment.

FIG. 7 is a flowchart of a method for detecting and repairing a broken single sign-on (SSO) integration, according to one embodiment. In one embodiment, the method is performed by the SSO troubleshooting module 125. In the Detect block, a broken integration is detected. For example, the broken integration is detected manually (e.g., using conventional techniques) or in a semi-automated or fully-automated manner (e.g., using the detection module 300). In one embodiment, the detection module 300 uses monitoring data and/or reporting data to detect the broken integration.

In the Fix block, a broken integration is repaired. For example, the broken integration is repaired manually (e.g., using conventional techniques) or in a semi-automated or fully-automated manner (e.g., using the repair module 310).

In the Phased Deployment block, a broken integration is replaced by an integration that works and deployed. For example, the SSO troubleshooting module 125 instructs the SSO service of the identity management system 120 to use the working integration instead of the broken integration (e.g., for one or more users).

Other Considerations

The present invention has been described in particular detail with respect to various possible embodiments. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

The present invention is well suited to a wide variety of computer network systems over numerous topologies.

Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method performed by an identity management system, the method comprising:
   storing, for each third-party service of a plurality of third-party services, a single sign-on (SSO) integration for the third-party service, the SSO integration comprising information enabling automated login to the third-party service;
   for a first one of the third-party services and a corresponding first one of the SSO integrations:
      successfully signing in users into accounts of the users on the first one of the third-party services using the first one of the SSO integrations; and
      detecting that the first one of the SSO integrations can no longer automatically sign in users into accounts of the users on the first one of the third-party services;
   repairing the first SSO integration responsive to detecting that the first SSO integration can no longer automatically sign in users into accounts of the users on the third-party service; and
   determining that the first SSO integration has been successfully repaired by:
      receiving a request from a user to login to the first third-party service;
      using the repaired first SSO integration to attempt to log the user into the first third-party service; and
      analyzing behavior of the user after the attempted login using the repaired first SSO integration.

2. The computer-implemented method of claim 1, wherein the detecting comprises:
   attempting login to the first one of the third-party services using incorrect credentials; and
   determining, based on output of the attempted login, that the attempted login was legitimate except for the incorrect credentials.

3. The computer-implemented method of claim 2, wherein determining that the attempted login was legitimate except for the incorrect credentials comprises determining whether a webpage that follows the attempted login includes specific strings of text indicating a login failure.

4. The computer-implemented method of claim 3, further comprising previously identifying the specific strings of text by attempting to login with invalid credentials to a plurality of different third-party services and identifying strings present in webpages that followed the attempted logins.

5. The computer-implemented method of claim 2, wherein determining that the attempted login was legitimate except for the incorrect credentials comprises:
   obtaining a first screenshot of the first third-party service's login page before the attempted login;
   obtaining a second screenshot of the first third-party service's login page after the attempted login; and
   comparing visual properties of the first screenshot and second screenshot.

6. The computer-implemented method of claim 5, wherein comparing the visual properties comprises determining whether the second screenshot includes an additional user interface element not included in the first screenshot.

7. The computer-implemented method of claim 5, wherein comparing the visual properties comprises determining whether the second screenshot includes a given color not included in the first screenshot.

8. The computer-implemented method of claim 1, wherein the detecting comprises comparing a login flow sequence of uniform resource locators (URLs) resulting from the attempted login to a baseline login flow sequence of uniform resource locators corresponding to a successful login.

9. The computer-implemented method of claim 8, further comprising establishing the baseline login flow sequence based on login flow sequences of a plurality of successful logins into the first third-party service by a plurality of different users.

10. The computer-implemented method of claim 1, wherein the detecting comprises:
    determining that a first user has attempted to login to the first third-party service using the first SSO integration multiple times during a given time period.

11. The computer-implemented method of claim 1, wherein the detecting further comprises:
    receiving a confirmation from the first user that the first user is encountering a login failure.

12. The computer-implemented method of claim 1, wherein the detecting is performed in response to a trigger event, the trigger event is at least one of the group consisting of an explicit request to test the first SSO integration, and expiration of a period of time since a previous test of the first SSO integration.

13. The computer-implemented method of claim 1, further comprising detecting that the first one of the SSO integrations can no longer automatically sign in users into accounts of the users on the third-party service due to a change in content of a login page of the first third-party service, based on comparison of a hash value of the login page computed at a time of the detecting and a hash value of the login page computed at a prior time when login into the first third-party service was successful.

14. The computer-implemented method of claim 13, further comprising identifying the login page by:
    navigating to a root page of a domain of the first third-party service;
    navigating to a page target of a login hyperlink of the root page; and
    responsive to identifying login user interface elements in the page target, identifying the page target as the login page.

15. The computer-implemented method of claim 1, wherein the repairing comprises:
    parsing a login page of the first third-party service to identify a username field and a password field; and
    storing the identified username field and the identified password field in the first SSO integration.

16. The computer-implemented method of claim 1, wherein the repairing comprises:
    parsing a login page of the first third-party service to identify a submit button that is a closest button in the login page to a password field in the login page; and
    storing the identified submit button in the first SSO integration.

17. The computer-implemented method of claim 16, wherein closeness is measured based on pixel distance.

18. The computer-implemented method of claim 16, wherein closeness is measured based on a distance in a document object model (DOM) tree of the login page.

19. The computer-implemented method of claim 1, further comprising determining that the first SSO integration has been successfully repaired by:
   receiving a request from a user to login to the first third-party service;
   using the repaired first SSO integration to attempt to log the user into the first third-party service; and
   comparing a login flow sequence of uniform resource locators (URLs) resulting from the attempted login to a baseline login flow sequence of uniform resource locators corresponding to a successful login.

20. The computer-implemented method of claim 1, wherein the SSO integration information enabling automated login to the third-party service comprises: an address of a sign-in page of the third-party service, and information about form fields of the sign-in page.

21. A computer-implemented method performed by an identity management system, the method comprising:
   storing, for each third-party service of a plurality of third-party services, a single sign-on (SSO) integration for the third-party service, the SSO integration comprising information enabling automated login to the third-party service;
   for a first one of the third-party services and a corresponding first one of the SSO integrations:
      successfully signing in users into accounts of the users on the first one of the third-party services using the first one of the SSO integrations; and
      detecting that the first one of the SSO integrations can no longer automatically sign in users into accounts of the users on the first one of the third-party services, the detecting comprising:
         attempting login to the first one of the third-party services using incorrect credentials; and
         determining, based on output of the attempted login, that the attempted login was legitimate except for the incorrect credentials, the determining comprising:
            obtaining a first screenshot of the first third-party service's login page before the attempted login;
            obtaining a second screenshot of the first third-party service's login page after the attempted login; and
            comparing visual properties of the first screenshot and second screenshot.

22. The computer-implemented method of claim 21, wherein comparing the visual properties comprises determining whether the second screenshot includes an additional user interface element not included in the first screenshot.

23. The computer-implemented method of claim 21, wherein comparing the visual properties comprises determining whether the second screenshot includes a given color not included in the first screenshot.

24. A computer-implemented method performed by an identity management system, the method comprising:
   storing, for each third-party service of a plurality of third-party services, a single sign-on (SSO) integration for the third-party service, the SSO integration comprising information enabling automated login to the third-party service;
   for a first one of the third-party services and a corresponding first one of the SSO integrations:
      successfully signing in users into accounts of the users on the first one of the third-party services using the first one of the SSO integrations; and
      detecting that the first one of the SSO integrations can no longer automatically sign in users into accounts of the users on the first one of the third-party services; and
   determining that the first one of the SSO integrations can no longer automatically sign in users into accounts of the users on the third-party service due to a change in content of a login page of the first third-party service, based on comparison of a hash value of the login page computed at a time of the detecting and a hash value of the login page computed at a prior time when login into the first third-party service was successful.

25. The computer-implemented method of claim 24, wherein the detecting comprises:
   attempting login to the first one of the third-party services using incorrect credentials; and
   determining, based on output of the attempted login, that the attempted login was legitimate except for the incorrect credentials.

26. The computer-implemented method of claim 24, wherein the detecting comprises comparing a login flow sequence of uniform resource locators (URLs) resulting from the attempted login to a baseline login flow sequence of uniform resource locators corresponding to a successful login.

27. The computer-implemented method of claim 24, wherein the detecting comprises:
   determining that a first user has attempted to login to the first third-party service using the first SSO integration multiple times during a given time period.

28. The computer-implemented method of claim 24, wherein the detecting is performed in response to a trigger event, the trigger event is at least one of the group consisting of an explicit request to test the first SSO integration, and expiration of a period of time since a previous test of the first SSO integration.

29. A computer-implemented method performed by an identity management system, the method comprising:
   storing, for each third-party service of a plurality of third-party services, a single sign-on (SSO) integration for the third-party service, the SSO integration comprising information enabling automated login to the third-party service;
   for a first one of the third-party services and a corresponding first one of the SSO integrations:
      successfully signing in users into accounts of the users on the first one of the third-party services using the first one of the SSO integrations; and
      detecting that the first one of the SSO integrations can no longer automatically sign in users into accounts of the users on the first one of the third-party services; and
   repairing the first SSO integration responsive to detecting that the first SSO integration can no longer automatically sign in users into accounts of the users on the third-party service, the repairing comprising:
      parsing a login page of the first third-party service to identify a submit button that is a closest button in the login page to a password field in the login page; and
      storing the identified submit button in the first SSO integration.

30. The computer-implemented method of claim 29, wherein the detecting comprises:

attempting login to the first one of the third-party services using incorrect credentials; and determining, based on output of the attempted login, that the attempted login was legitimate except for the incorrect credentials.

31. The computer-implemented method of claim 29, wherein the detecting comprises comparing a login flow sequence of uniform resource locators (URLs) resulting from the attempted login to a baseline login flow sequence of uniform resource locators corresponding to a successful login.

32. The computer-implemented method of claim 29, wherein the detecting comprises:

determining that a first user has attempted to login to the first third-party service using the first SSO integration multiple times during a given time period.

33. The computer-implemented method of claim 29, wherein the detecting is performed in response to a trigger event, the trigger event is at least one of the group consisting of an explicit request to test the first SSO integration, and expiration of a period of time since a previous test of the first SSO integration.

* * * * *